(12) United States Patent
Palmer et al.

(10) Patent No.: US 11,962,217 B2
(45) Date of Patent: Apr. 16, 2024

(54) BEARING LOCKPLATE SUPPORTING ELECTRIC MOTOR SHAFT GROUND

(71) Applicant: Nidec Motor Cororation, St. Louis, MO (US)

(72) Inventors: Steven R. Palmer, Highland, IL (US); Chetan O. Modi, Valley Park, MO (US); Chuck Roessler, St. Louis, MO (US); John H. Hussey, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 460 days.

(21) Appl. No.: 17/306,589

(22) Filed: May 3, 2021

(65) Prior Publication Data
US 2022/0069661 A1 Mar. 3, 2022

Related U.S. Application Data

(60) Provisional application No. 63/070,092, filed on Aug. 25, 2020.

(51) Int. Cl.
H02K 5/16 (2006.01)
H02K 5/173 (2006.01)
H02K 7/00 (2006.01)
H02K 7/08 (2006.01)

(52) U.S. Cl.
CPC .......... H02K 5/1732 (2013.01); H02K 7/003 (2013.01); H02K 7/083 (2013.01); H02K 2201/03 (2013.01)

(58) Field of Classification Search
CPC ..... F16C 29/12; F16C 29/10; H02K 2201/03; H02K 7/083; H02K 7/003; H02K 5/1732

USPC ........................... 384/210, 217, 435; 310/90
See application file for complete search history.

(56) References Cited

U.S. PATENT DOCUMENTS 6,172,436 B1 * 1/2001 Subler ................. F16C 33/6662
310/90
6,670,733 B2 * 12/2003 Melfi ..................... H02K 11/40
310/90

FOREIGN PATENT DOCUMENTS

DE 102014225225 A1 * 6/2016 ............. H02K 11/40

OTHER PUBLICATIONS

Machine translation DE102014225225; Deak et al.; Jun. 2016 (Year: 2016).*
Printout from HPAC Engineering website (https://www.hpac.com/new-products/article/20928124/baldor-introduces-shaftgrounding-brushPlease) identified publication date of Oct. 8, 2015 (printed Jul. 20, 2021).

* cited by examiner

Primary Examiner — Terrance L Kenerly
(74) Attorney, Agent, or Firm — Hovey Williams LLP

(57) ABSTRACT

An electric motor includes a stator assembly and a rotor assembly. The rotor assembly includes a rotor shaft that is rotatable relative to the stator assembly about a rotation axis. The motor also includes an endshield, a bearing assembly rotatably supporting the rotor shaft on the endshield, a shaft ground assembly electrically coupled to the rotor shaft, and a bearing lockplate. The bearing lockplate is fixedly coupled to the endshield. The shaft ground assembly is supported by the bearing lockplate on the endshield.

20 Claims, 6 Drawing Sheets

BEARING LOCKPLATE SUPPORTING ELECTRIC MOTOR SHAFT GROUND

CROSS-REFERENCE TO RELATED APPLICATIONS

This application claims the priority benefit of identically-titled U.S. Provisional Patent Application Ser. No. 63/070,092 filed Aug. 25, 2020, the entire disclosure of which is incorporated herein by reference.

BACKGROUND

The embodiments described herein relate generally to an electric motor, and more particularly, to an electric motor having a bearing lockplate supporting an output shaft ground assembly.

Electric motors are used in various household, office, automotive, and industrial applications. Electric motors typically include a rotor and a stator. The stator generally consists of an electromagnet. When electrical energy is supplied to the stator, a magnetic field is generated. The magnetic field produces a torque that rotates the rotor. The rotor typically includes an output shaft that connects to an output device, such as a fan, belt, pulley, gear, etc. Electric motors can be used in a number of orientations, including a vertical orientation.

A vertically mounted electric motor is one in which the output shaft is oriented vertically to enable the output shaft to be coupled to an output device positioned above or below the electric motor. During operation of an electric motor, the rotating components of the motor generate vibrations. An electric motor and housing system has a resonance frequency, which is a function, in part, of the mass of the electric motor and the distribution of the mass. If the frequency of the generated vibrations of the electric motor is close to or the same as the resonance frequency of the electric motor, the vibrations are amplified, potentially resulting in mechanical issues with the motor. For example, in a vertically mounted electric motor, amplified vibrations can cause one or more of the output shaft bearings to move, potentially becoming unseated from its respective bearing pocket, or can cause bearing fretting damage.

In addition, some electric motors induce electrical currents in the output shaft of the electric motor. The induced electrical current seeks a path of least resistance to ground, which is typically through the output shaft bearings. These electrical currents result in arcing between bearings and bearing races. Such arcing over a period of time causes pitting/fluting in the output shaft bearings. The pitted/damaged bearings causes noise, vibration, and premature bearing failure.

SUMMARY

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

In one aspect, an electric motor is provided. The electric motor includes a stator assembly and a rotor assembly. The rotor assembly includes a rotor shaft rotatable relative to the stator assembly about a rotation axis. The motor further includes an endshield, a bearing assembly rotatably supporting the rotor shaft on the endshield, a shaft ground assembly electrically coupled to the rotor shaft, and a bearing lockplate. The bearing lockplate is fixedly coupled to the endshield. The shaft ground assembly is supported by the bearing lockplate on the endshield.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each figure depicts an embodiment of a particular aspect of the disclosed systems and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
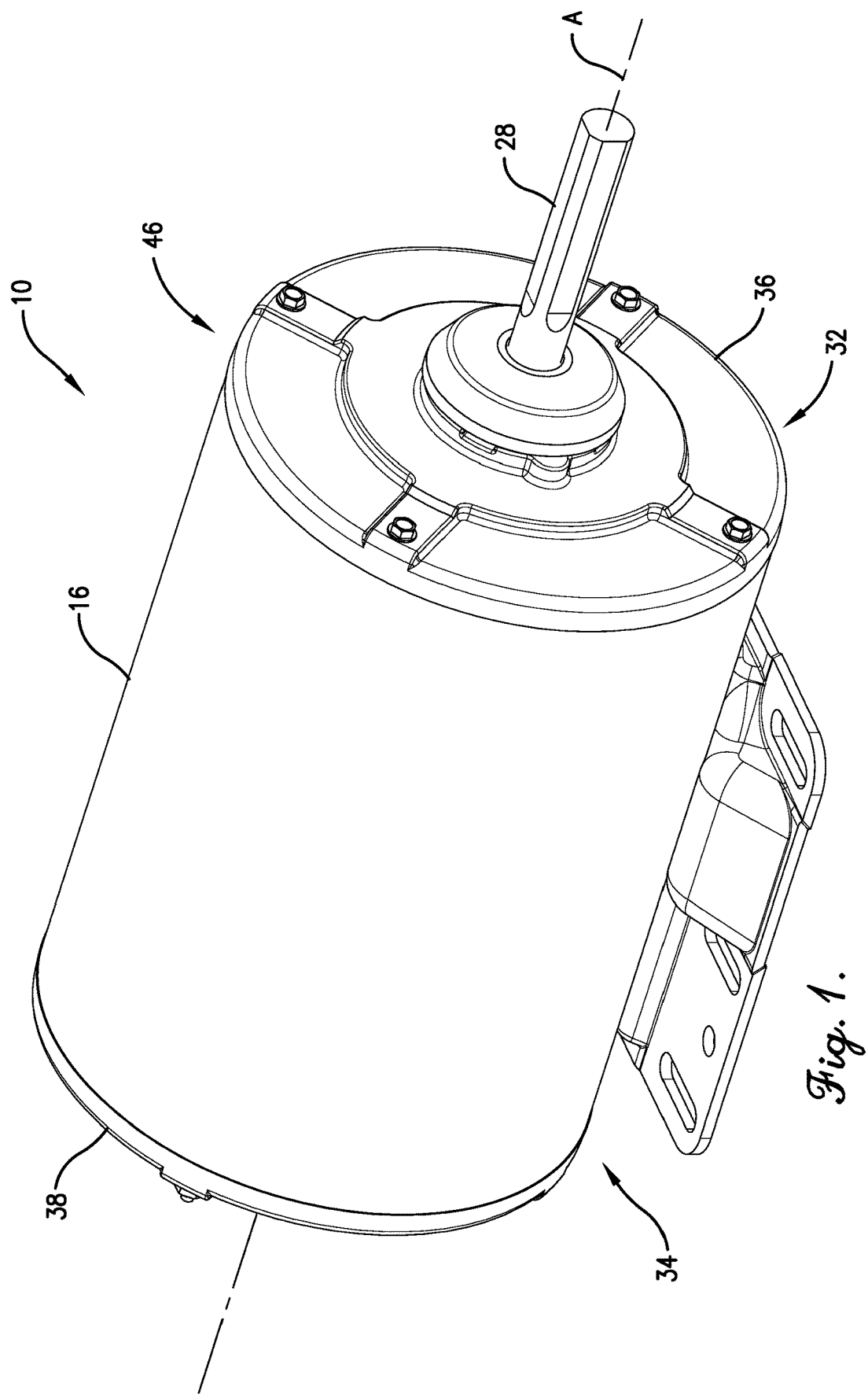
FIG. 1 is a perspective view of an exemplary electric motor, in accordance with one aspect of the present invention.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein. While the drawings do not necessarily provide exact dimensions or tolerances for the illustrated components or structures, the drawings are to scale with respect to the relationships between the components of the structures illustrated in the drawings.

DETAILED DESCRIPTION

The following detailed description of embodiments of the disclosure references the accompanying figures. The embodiments are intended to describe aspects of the disclosure in sufficient detail to enable those with ordinary skill in the art to practice the disclosure. The embodiments of the disclosure are illustrated by way of example and not by way of limitation. Other embodiments may be utilized, and changes may be made, without departing from the scope of the claims. The following description is, therefore, not limiting. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be clear to those skilled in the art from the description. For example, a feature, structure, act, etc. described in one embodiment may also be included in other embodiments but is not necessarily included. Thus, the present technology can include a variety of combinations and/or integrations of the embodiments described herein.

In the following specification and the claims, reference will be made to several terms, which shall be defined to have the following meanings. The singular forms "a," "an," and "the" include plural references unless the context clearly dictates otherwise. "Optional" or "optionally" means that the subsequently described event or circumstance may or may not occur, and that the description includes instances where the event occurs and instances where it does not.

Approximating language, as used herein throughout the specification and the claim, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations extending substantially parallel to a longitudinal or rotation axis of the motor assembly. The terms "radial" and "radially" refer to directions and orientations extending substantially perpendicular to the rotation axis. The terms "tangent" and "tangential" refer to the directions and orientations extending substantially perpendicular to a radial direction of the motor assembly. In addition, as used herein, the terms "circumferential" and "circumferentially" refer to directions and orientations extending in the general direction around the rotation axis of the motor assembly (such references not being limited to pure circular extension or to the periphery or outer perimeter of the object unless the context clearly indicates otherwise). Moreover, directional references, such as, "top," "bottom," "front," "back," "side," and similar terms are used herein solely for convenience and should be understood only in relation to each other. For example, a component might in practice be oriented such that faces referred to herein as "top" and "bottom" are in practice sideways, angled, inverted, etc. relative to the chosen frame of reference.

Example Electric Motor

Figure 2:
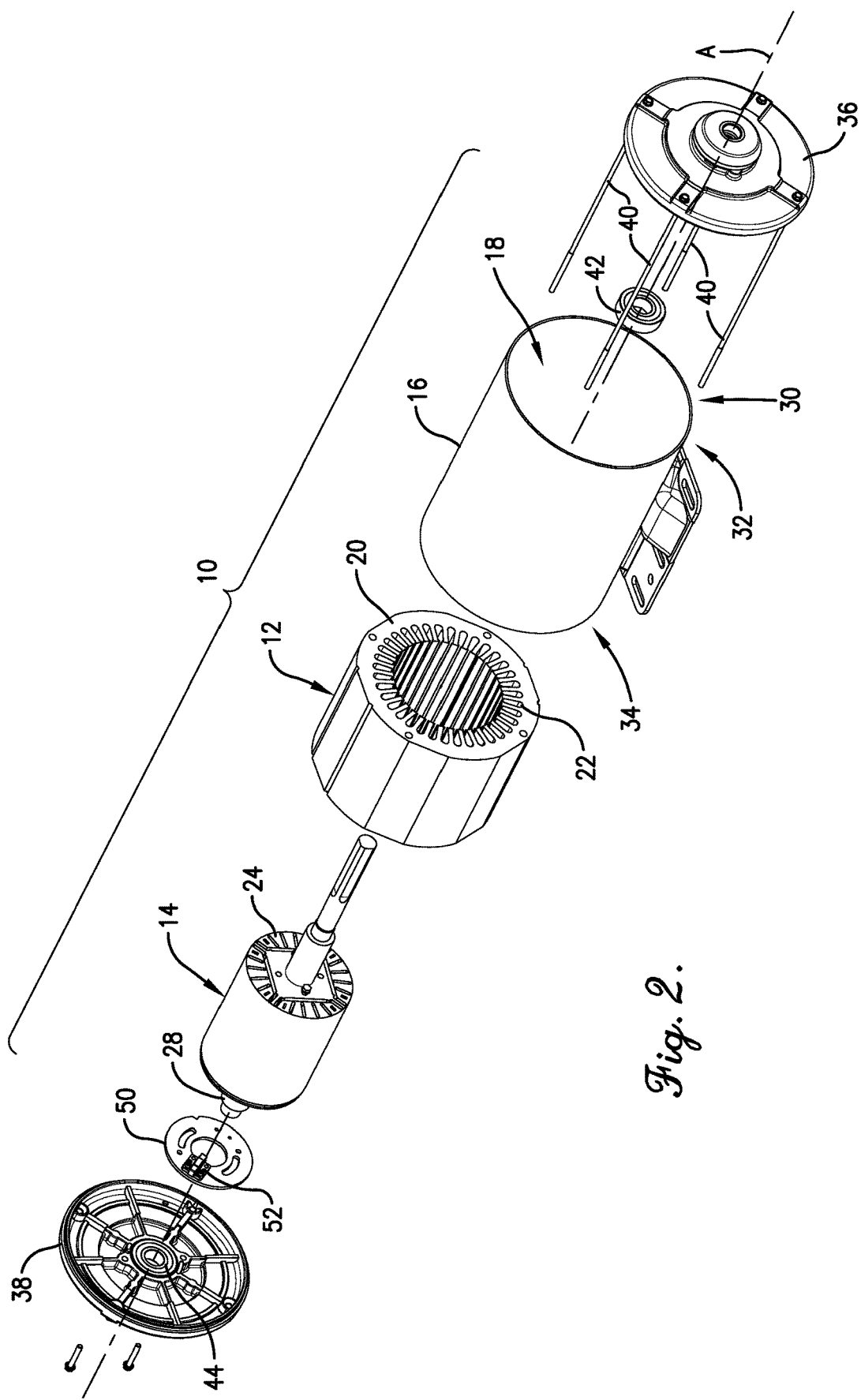
FIG. 2 is an exploded perspective view of a portion of the electric motor shown in FIG. 1.

FIG. 1 is a perspective view of an exemplary electric motor 10, in accordance with one aspect of the present invention. FIG. 2 is an exploded perspective view of at least a portion of the electric motor 10. In the exemplary embodiment, the electric motor 10 is illustrated as an inner rotor motor. As described herein, an inner rotor motor has a rotor positioned radially inward relative to a stator. However, according to some aspects of the present invention, the electric motor 10 may alternately be an outer rotor motor or dual rotor motor.

As shown in FIGS. 1 and 2, the illustrated electric motor 10 broadly includes a stator assembly 12 and a rotor assembly 14 substantially enclosed within an outer shell 16. The rotor assembly 14 is supported for rotation relative to the stator assembly 12 about an axis of rotation "A." The outer shell 16 is generally cylindrical in shape and includes a cavity 18 for receiving at least a portion of the stator assembly 12 and the rotor assembly 14.

The stator assembly 12 is generally toroidal in form and defines a stator axis that is coaxial with the axis of rotation "A." However, according to some aspects of the present invention, it is permissible for the axes to be non-coaxial. The stator assembly 12 preferably includes a stator core 20 and a plurality of coils (not shown) wound about the stator core 20. Furthermore, in some embodiments, the stator assembly 12 includes a plurality of electrically insulative coverings (not shown) positioned between the stator core 20 and the coils.

The stator core 20 preferably is fabricated from steel and may be of either solid or laminated construction. Alternatively, or additionally, the stator core 20 may be segmented in form. However, according to certain aspects of the present invention, the stator core 20 may be fabricated from any one or more of a variety of suitable materials and/or construction methods.

The stator core 20 preferably includes an annular yoke (not shown) and a plurality of arcuately spaced apart teeth 22 extending at least generally radially inward from the yoke. It is contemplated that the stator core 20 can have any number of teeth 22 that enables the electric motor 10 to function as described herein. While not illustrated in FIGS. 1 and 2, the plurality of coils (discussed above) are formed by electrically conductive wiring wound being about each of the teeth 22. The wiring encircles each tooth to form the coils, with each of the coils corresponding to one of the teeth 22. The wiring is preferably copper, although aluminum or any one or more of a variety of electrically conductive materials may be used without departing from the scope of the present invention.

In the exemplary embodiment, the rotor assembly 14 includes a rotor core 24 and a rotor shaft 28. The rotor shaft 28 defines a rotation axis for the rotor assembly 14. The rotation axis of the rotor assembly 14 is coaxial with the axis of rotation "A."

The rotor core 24 is generally cylindrical in form and preferably is fabricated from steel. The rotor core 24 may be of either solid or laminated construction. Alternatively, or additionally, the rotor core 24 may be segmented in form. However, according to certain aspects of the present invention, the rotor core 24 may be fabricated from any one or more of a variety of suitable materials and/or construction methods.

As described above, the electric motor 10 includes the outer shell 16. The outer shell 16 is generally cylindrical in shape and extends generally circumferentially about the stator assembly 12. Alternatively, according to certain aspects of the present invention, the outer shell 16 may extend about the stator assembly 12 in such a way as to provide one or more flat sides or to be otherwise alternatively shaped. In the exemplary embodiment, the outer shell 16 presents axially opposite first and second shell ends 32 and 34, respectively, and extends substantially continuously about the stator assembly 12 and rotor assembly 14 to enclose, at least in part, the stator assembly 12 and the rotor assembly 14. However, according to certain aspects of the present invention, the outer shell 16 may include openings or slots therethrough. For example, in certain embodiments, one or more openings or slots may be provided to facilitate ventilation and/or access.

The outer shell 16 forms a portion of a motor case 46 of the electric motor 10. The motor case 46 includes the outer shell 16 and first and second endshields 36 and 38, respectively. The outer shell 16 and the first and second endshields 36 and 38 cooperatively define a motor chamber 30 that at least substantially receives the stator assembly 12 and the rotor assembly 14. More particularly, the first endshield 36 is positioned adjacent the first shell end 32 and coupled thereto. In addition, the second endshield 38 is positioned adjacent the second shell end 34 and coupled thereto. Specifically, the outer shell 16 is coupled to and held in place between the first and second endshields 36 and 38 by a plurality of fasteners 40 extending between and coupled to the endshields 36 and 38. It is contemplated that, in certain aspects of the present invention, one more of the first and second endshields 36 and 38 may be located inwardly or spaced outward from the respective shell ends 32 and 34.

The electric motor 10 includes first and second bearing assemblies 42 and 44 that cooperatively rotatably support the rotor shaft 28 of the rotor assembly 14. The first endshield 36 is configured to support the first bearing assembly 42, and the second endshield 38 is configured to support the second bearing assembly 44, as described further herein. Alternative or additional bearing assembly supports may be provided without departing from the scope of the present invention.

In the exemplary embodiment, the electric motor 10 is configured to be mounted vertically. As described above, a vertically mounted electric motor is one in which the output shaft (i.e., the rotor shaft 28) is oriented vertically to enable the output shaft to be coupled to an output device positioned above or below the electric motor 10. Therefore, to facilitate securing one or more of the bearing assemblies 42 and 44 in a respective bearing support, the electric motor 10 includes at least one internal bearing lockplate 50. It is noted, however, that the internal bearing lockplate 50 may be used with any electric motor, positioned in any orientation, including, for example, a horizontally mounted motor where the output shaft is oriented generally horizontally.

The internal bearing lockplate 50 also supports a shaft ground 52 configured for electrically grounding the rotor shaft 28 of an electric motor 10, and as such, functions as a multipurpose adapter/mounting plate. The shaft ground 52 includes a conductive element configured to electrically couple to the rotor shaft 28. The body of the shaft ground 52 includes an enclosure fabricated from an electrically conductive material. The conductive element fits within the enclosure to both secure the conductive element in place and electrically connect the conductive element to the enclosure and the second endshield 38. The conductive interface of the shaft ground 52 between the rotor shaft 28 and the second endshield 38 provides a path for an electrical charge from the motor shaft 28 to pass through the conductive element, the body of the shaft ground 52, and the second endshield 38 to an electrical ground. Alternate methods form a ground path using a wire or other electrical conductor (not shown) that is attached to the shaft ground 52 and provides a path for an electric charge from the rotor shaft 28 to pass through the conductive element and shaft ground body to an electric ground. While the shaft ground 52 described herein includes an enclosed carbon brush configuration, it is noted that the shaft ground 52 may include, without limitation, a grounding ring, a shaft grounding brush, combinations thereof, and the like.

While the detailed description below discusses coupling the internal bearing lockplate 50 to the second endshield 38, if should be noted that the description applies equally to the first and/or second endshields 36 and 38. In embodiments where the electric motor 10 may be used, for example, in a shaft up orientation, it is contemplated that the electric motor 10 will include an internal bearing lockplate 50 coupled the first endshield 36. In embodiments where the electric motor 10 may be used at least part of the time in a shaft down orientation and another part of the time in a shaft up orientation, it is contemplated that the electric motor 10 will include a respective internal bearing lockplate 50 coupled to each of the first and second endshields 36 and 38.

Figure 3:
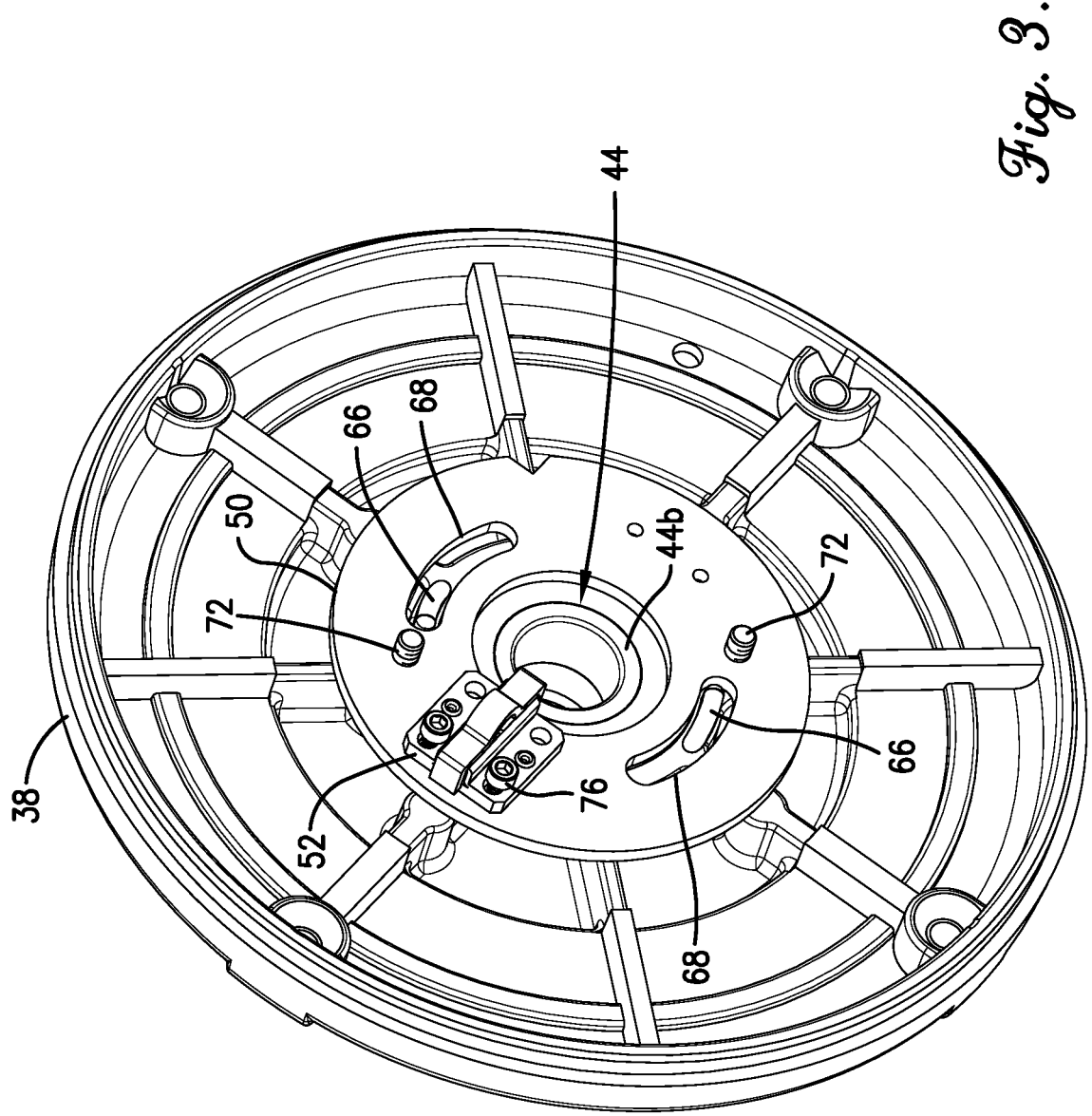
FIG. 3 is a perspective view of an endshield assembly of the electric motor shown in FIG. 1, illustrating an internal bearing lockplate and shaft ground coupled thereto.
Figure 4:
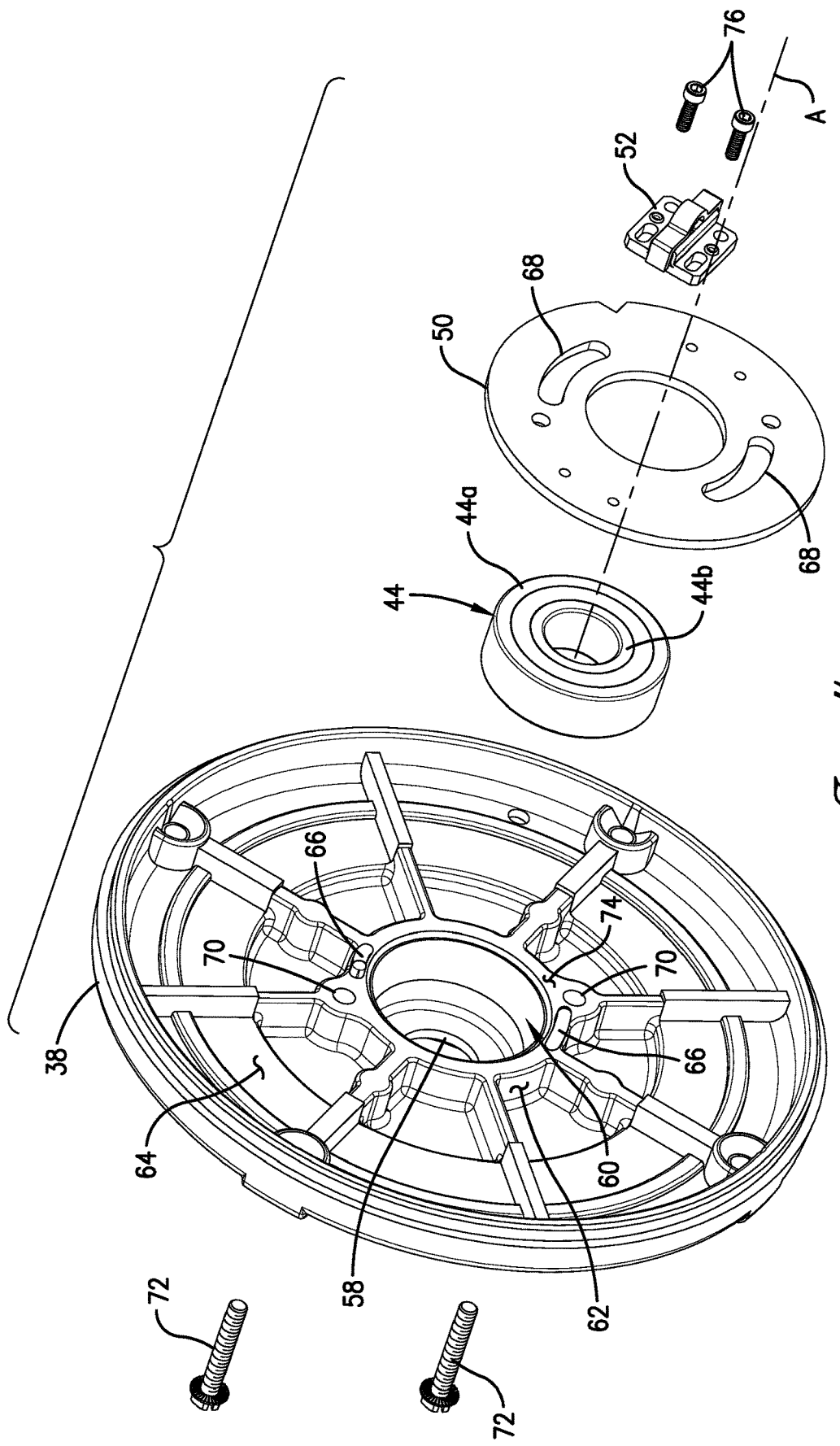
FIG. 4 is an exploded perspective view of the endshield assembly shown in FIG. 3.

FIG. 3 is a perspective view illustrating the second endshield 38 with the internal bearing lockplate 50 and the shaft ground 52 coupled thereto. FIG. 4 is an exploded perspective view illustrating how the second endshield 38, the second bearing assembly 44, the internal bearing lockplate 50, and the shaft ground 52 are arranged in the exemplary electric motor 10. In the exemplary embodiment, the second endshield 38 is substantially annular in shape and includes a central aperture 58 for allowing the rotor shaft 28 of the rotor assembly 14 to extend therethrough. For example, in one aspect of the present invention, the rotor shaft 28 extends through the aperture 58 and is coupled to an encoder (not shown) positioned proximate an exterior surface of the second endshield 38.

As shown in FIG. 4, the second endshield 38 includes a bearing pocket 60 receiving the second bearing assembly 44 therein to rotatably support at least an end of the rotor shaft 28 on the second endshield 38. The bearing pocket 60 is defined by a first annular wall 62 extending axially inward from an interior surface 64 of the second endshield 38. The annular wall 62 is formed substantially concentric with the aperture 58, which is concentric with the axis of rotation "A." In the exemplary embodiment, the annular wall 62 is continuous. However, in certain aspects of the present invention, the annular wall 62 may formed by two or more segments.

The second endshield 38 also includes a plurality of axially extending internal tabs 66. Each internal tab 66 extends inwardly from an inner edge of the annular wall 62. The internal tabs 66 function as registration pins to facilitate locating the internal bearing lockplate 50. Referring to FIG. 3, the internal bearing lockplate 50 includes a plurality of arcuate slots 68 formed therein, each slot 68 configured to receive a respective one of the internal tabs 66. The internal tabs 66 are arcuately undersized relative to the arcuate slots 68 so as to permit limited arcuate shifting of the internal bearing lockplate 50 relative to the second endshield 38. As such, the arcuate slots 68 facilitate centering and rotatably locating the internal bearing lockplate 50 on the second endshield 38.

In the exemplary embodiment, the second bearing assembly 44 is a ball bearing assembly including a plurality of steel balls (not shown) positioned between an outer race 44a and an inner race 44b. The outer race 44a of the bearing assembly 44 is coupled to the bearing pocket 60, and more particularly, to an inner surface of the annular wall 62 defining the bearing pocket 60. The inner race 44b is fixedly coupled to the rotor shaft 28 and is configured to rotate relative to the outer race 44a via the interposed steel balls. In alternative embodiments, the second bearing assembly 44 can be any type of bearing and/or bearing assembly that enables the electric motor 10 to function as described herein, such as a roller bearing.

The internal bearing lockplate 50 is sized to engage the outer race 44a of the second bearing assembly 44 to secure the second bearing assembly 44 in the bearing pocket 60. In the exemplary embodiment, a plurality of lockplate fasteners 72 extend through respective fastener holes 70 defined through the second endshield 38. Each lockplate fastener 72 threadably engages the internal bearing lockplate 50, thereby securing the lockplate against the outer race 44a of the bearing assembly 44 along an interior side 74 of the second endshield 38. The shaft ground 52 is coupled to the internal bearing lockplate 50 with a plurality of shaft ground fasteners 76, each of which is configured to threadably engage the internal bearing lockplate 50. It is noted that other means of fastening the internal bearing lockplate 50 to the second endshield 38 are within certain aspects of the present invention.

Internal Bearing Lockplate

Figure 5:
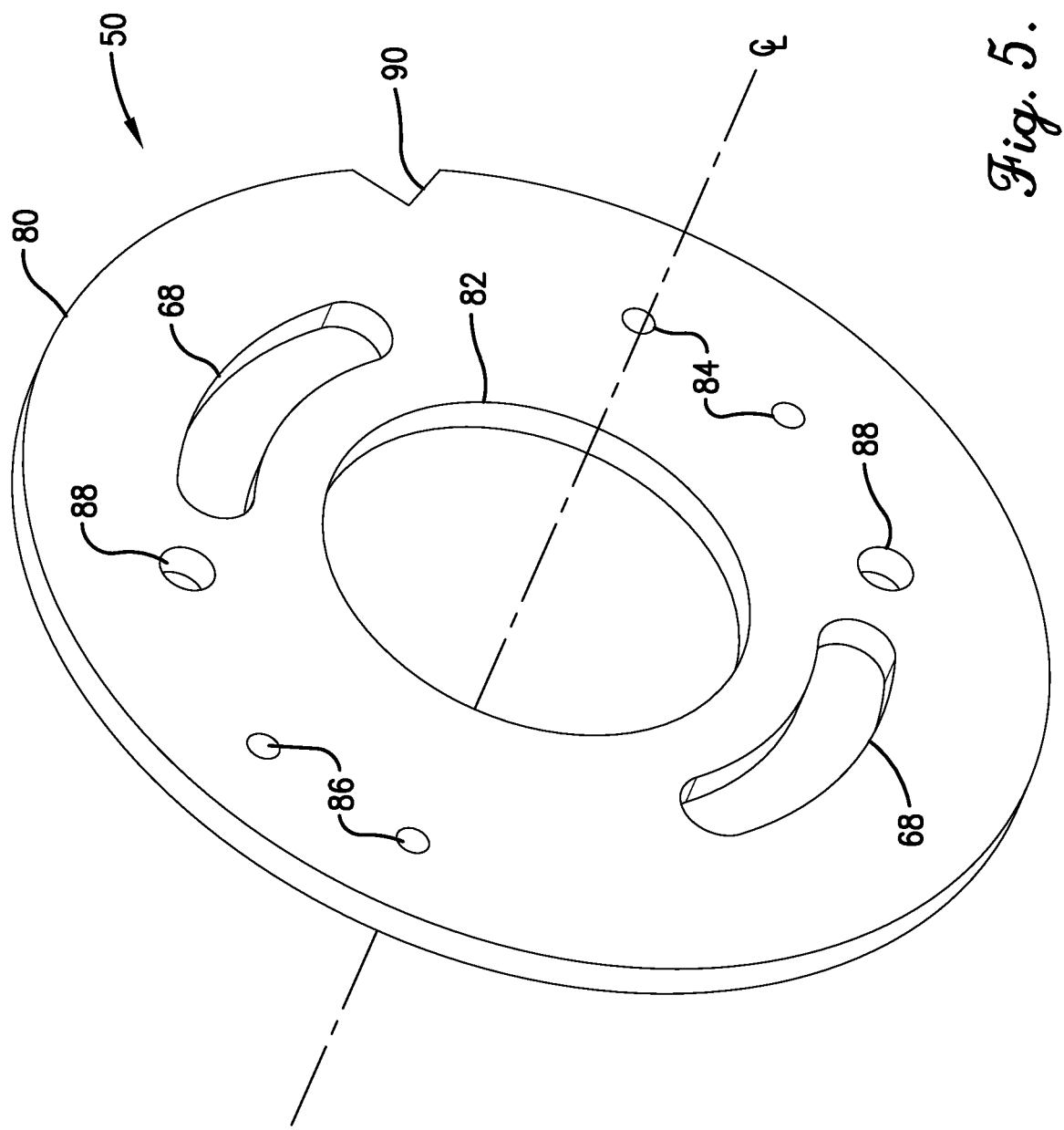
FIG. 5 is a perspective view of the internal bearing lockplate shown in FIGS. 3 and 4.
Figure 6:
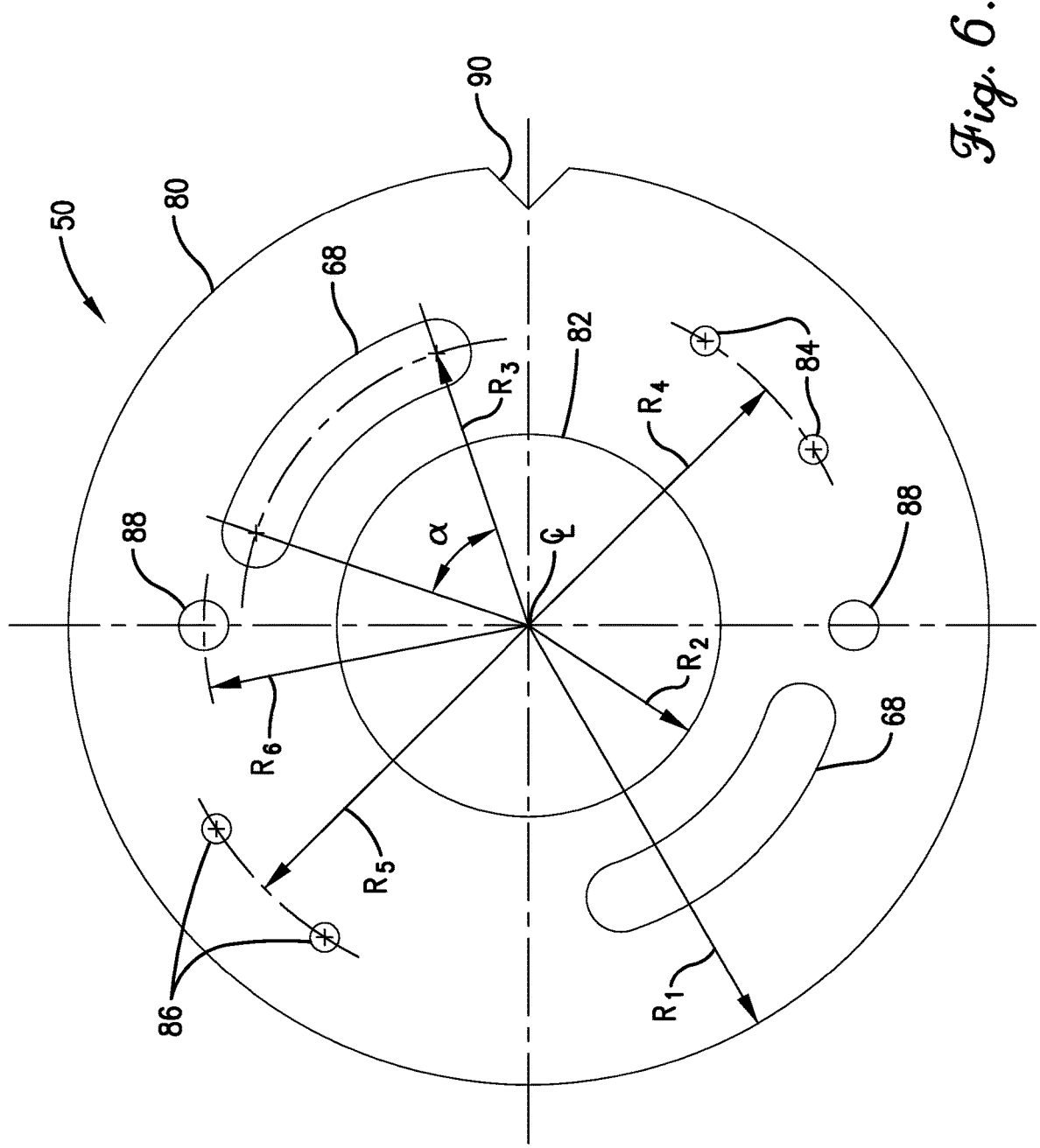
FIG. 6 is a side view of the internal bearing lockplate shown in FIG. 5.

FIG. 5 is a perspective view of the internal bearing lockplate 50, and FIG. 6 is a side view of the internal bearing lockplate 50. In the exemplary embodiment, the internal bearing lockplate 50 is formed from a suitable plate like material (e.g., sheet metal) having substantially parallel opposite faces. The internal bearing lockplate 50 is substantially circular in form, having a substantially circumferentially continuous annular body 80 extending about a centerline ($\mathcal{C}$) at a predetermined radial distance $R_1$. The internal bearing lockplate 50 includes shaft relief portion 82 substantially centered thereon about the centerline ($\mathcal{C}$). The shaft relief portion 82 defines a circular opening having a predetermined radial distance $R_2$ from the centerline ($\mathcal{C}$). The shaft relief portion 82 is configured to receive the rotor shaft 28 (shown in FIGS. 1 and 2) therethrough.

The internal bearing lockplate 50 includes the plurality of slots 68 formed therein. In the exemplary embodiment, the internal bearing lockplate 50 includes two (2) arcuate slots 68. It is contemplated, however, that the internal bearing lockplate 50 may have fewer or more than two (2) arcuate slots 68, based at least partially upon the configuration of the electric motor 10.

The plurality of arcuate slots 68 have substantially the same size and shape, extending arcuately relative to the centerline ($\mathcal{C}$) in a semicircular arc at an angle α in the range between and including about forty-five degrees (45°) and about sixty degrees (60°). In addition, as illustrated in FIG. 6, the two (2) arcuate slots 68 are positioned about the centerline ($\mathcal{C}$) at approximately one hundred and eighty degrees (180°), or diametrically opposite, from each other. Each of the arcuate slots 68 is defined about a radius centered at the centerline ($\mathcal{C}$) at a radial distance of $R_3$. It is noted that the slots 38 are formed with fully rounded slot ends. Alternatively, in certain other embodiments, the slot ends may be formed with any shape that enables the internal bearing lockplate 50 to function as described herein.

Furthermore, the internal bearing lockplate 50 includes first and second groupings of shaft ground mounting holes 84 and 86, respectively. The first grouping of shaft ground mounting holes 84 is positioned a predetermined radial distance $R_4$ from the centerline ($\mathcal{C}$). The radial distance $R_4$ is greater than radial distance $R_2$ and less than radial distance $R_1$, thereby locating the shaft ground mounting holes 84 within the body 80 of the internal bearing lockplate 50. In the exemplary embodiment, each shaft ground mounting hole 84 is threaded and is configured to receive a shaft ground fastener 76 (shown in FIG. 4) for securing the shaft ground 52 (shown in FIG. 4) to the internal bearing lockplate 50. In certain other embodiments, the shaft ground mounting holes 84 may be other than threaded.

In addition, the second grouping of shaft ground mounting holes 86 is positioned a predetermined radial distance $R_5$ from the centerline ($\mathcal{C}$). The radial distance $R_5$ is greater than radial distance $R_2$ and $R_4$, and less than radial distance $R_1$, thereby locating the shaft ground mounting holes 86 within the body 80 of the internal bearing lockplate 50, but at a further outward location than the shaft ground mounting holes 84. This facilitates locating the shaft ground 52 further outward from the centerline ($\mathcal{C}$) to accommodate larger shaft diameters. In the exemplary embodiment, each shaft ground mounting hole 86 is threaded and is configured to receive a shaft ground fastener 76 (shown in FIG. 4) for securing the shaft ground 52 (shown in FIG. 4) to the internal bearing lockplate 50. In certain other embodiments, the shaft ground mounting holes 84 may be other than threaded.

While the internal bearing lockplate 50 is illustrated with first and second groupings of shaft ground mounting holes 84 and 86, it is contemplated that more than two (2) groupings may be included. Furthermore, while the illustrated groupings 84 and 86 are shown being located approximately one hundred and eighty degrees (180°) apart, relative to the centerline ($\mathcal{C}$), in some applications, other angular spacing may be used. For example, in some embodiments, it may be desirable to simultaneously utilize multiple shaft grounds mounted at about ninety-degree (90°) angles relative to one another to accommodate potential orthogonal shaft deflections.

In the exemplary embodiment, the internal bearing lockplate 50 includes two (2) fastener holes 88 spaced a predetermined radial distance of $R_6$ from the centerline ($\mathcal{C}$). The radial distance $R_6$ is greater than radial distance $R_2$ and less than radial distance $R_1$, thereby locating the fastener holes 88 within the body 80 of the internal bearing lockplate 50. In the exemplary embodiment, each fastener hole 88 is threaded and is configured to receive a lockplate fastener 72 (shown in FIG. 4) for securing the internal bearing lockplate 50 to second endshield 38, and thereby securing the bearing assembly 44 in place. In certain other embodiments, the fastener holes 88 may be other than threaded. As illustrated in FIG. 4, each lockplate fastener 72 extends through the second endshield 38 from the exterior side of the motor with its fastener head (not labelled) position against the exterior side of the second endshield 38. As illustrated in FIG. 6, the two (2) fastener holes 88 are positioned about the centerline ($\mathcal{C}$) at approximately one hundred and eighty degrees (180°), or diametrically opposite, from each other.

The internal bearing lockplate 50 includes a "V" notch 90 located at an outer circumferential edge of the body 80. The "V" notch 90 functions as a visual orientation feature to facilitate assembly of the electric motor 10, for example, by enabling a user to visually identify an orientation of the internal bearing lockplate 50 relative to the electric motor 10. In addition, the "V" notch 90 facilitates a user being able to visually identify a location of the groupings of shaft ground mounting holes 84 and 86, which are utilized for different shaft diameters.

It is noted that the relative locations of the arcuate slots 68, shaft ground mounting holes 84, shaft ground mounting holes 86, fastener holes 88, and the "V" notch 90 are determined based, at least in part, on the configuration of the electric motor 10. While the embodiments illustrated herein illustrate one such embodiment of the internal bearing lockplate 50, it is understood that any one or more of the slots/holes/notch can be positioned in any desired location on the internal bearing lockplate 50.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

Those of ordinary skill in the art will appreciate that any suitable combination of the previously described embodiments may be made without departing from the spirit of the present invention.

The preferred forms of the invention described above are to be used as illustration only and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

The invention claimed is:

1. An electric motor comprising:
a stator assembly;
a rotor assembly including a rotor shaft rotatable relative to the stator assembly about a rotation axis;
an endshield;
a bearing assembly rotatably supporting the rotor shaft on the endshield;
a shaft ground assembly electrically coupled to the rotor shaft; and
a bearing lockplate fixedly coupled to the endshield,
said shaft ground assembly being supported by the bearing lockplate on the endshield,
the endshield presenting an interior surface and including an annular wall extending axially inward from the interior surface,
the annular wall defining a bearing pocket arranged substantially concentric with the rotation axis,
the bearing assembly being positioned at least partially in the bearing pocket,
the endshield including a plurality of internal tabs that extend axially inward from the annular wall,
the bearing lockplate including a plurality of arcuate slots defined therein, with each of said slots receiving a respective one of the internal tabs,
each of the internal tabs being arcuately undersized relative to the respective slot so as to permit limited arcuate shifting of the bearing lockplate relative to the endshield.

2. The electric motor in accordance with claim 1,
said annular wall of the endshield presenting an inner surface,
the bearing assembly including an outer race and an inner race spaced radially inward of the outer race,
the outer race being coupled to the inner surface,
the inner race being coupled to the rotor shaft,
the bearing lockplate engaging the outer race of the bearing assembly to secure the bearing assembly in the bearing pocket.

3. An electric motor comprising:
a stator assembly;
a rotor assembly including a rotor shaft rotatable relative to the stator assembly about a rotation axis;
an endshield;
a bearing assembly rotatably supporting the rotor shaft on the endshield;
a shaft ground assembly electrically coupled to the rotor shaft;
a bearing lockplate fixedly coupled to the endshield,
said shaft ground assembly being supported by the bearing lockplate on the endshield; and
a shaft ground fastener,
the bearing lockplate including a plurality of shaft ground mounting holes,
the shaft ground fastener being received in a respective one of the shaft ground mounting holes and coupling the shaft ground assembly to the bearing lockplate.

4. The electric motor in accordance with claim 3,
the plurality of shaft ground mounting holes including a first grouping and a second grouping,
the first grouping of shaft ground mounting holes positioned a first radial distance from a center of the bearing lockplate,
the second grouping of shaft ground mounting holes positioned a second radial distance from the center of the bearing lockplate,
the second radial distance being greater than the first radial distance.

5. The electric motor in accordance with claim 4,
the first grouping of shaft ground mounting holes being arcuately spaced about one hundred and eighty degrees (180°) from the second grouping of shaft ground mounting holes relative to the rotation axis.

6. The electric motor in accordance with claim 3,
the plurality of shaft ground mounting holes including a first grouping and a second grouping,
the first grouping of shaft ground mounting holes being arcuately spaced about one hundred and eighty degrees (180°) from the second grouping of shaft ground mounting holes relative to the rotation axis.

7. The electric motor in accordance with claim 3,
the bearing lockplate presenting an outer circumferential edge that includes a notch defined therein for identifying an orientation of the bearing lockplate.

8. The electric motor in accordance with claim 3,
the shaft ground assembly including a conductive element electrically coupled to the rotor shaft.

9. The electric motor in accordance with claim 8,
the conductive element comprising one or more of a carbon brush, a grounding ring, and a shaft grounding brush.

10. The electric motor in accordance with claim 3,
the bearing lockplate including a substantially planar first plate surface and a parallel opposite second plate surface,
the first plate surface engaging at least a portion of the bearing assembly,
the shaft ground assembly being coupled to the second plate surface.

11. The electric motor in accordance with claim 3,
the bearing lockplate including a shaft relief portion and a fastener hole located outboard of the shaft relief portion,
the shaft relief portion receiving the rotor shaft.

12. The electric motor in accordance with claim 3,
the bearing lockplate including a circumferentially continuous annular body.

13. An electric motor comprising:
a stator assembly;
a rotor assembly including a rotor shaft rotatable relative to the stator assembly about a rotation axis;
an endshield;
a bearing assembly rotatably supporting the rotor shaft on the endshield;
a shaft ground assembly electrically coupled to the rotor shaft; and
a bearing lockplate fixedly coupled to the endshield,
said shaft ground assembly being supported by the bearing lockplate on the endshield,
the endshield including a plurality of axially extending internal tabs,
the bearing lockplate including a plurality of arcuate slots defined therein, with each of said slots receiving a respective one of the internal tabs,
each of the internal tabs being arcuately undersized relative to the respective slot so as to permit limited arcuate shifting of the bearing lockplate relative to the endshield.

14. The electric motor in accordance with claim 13, further comprising:
the endshield including a plurality of fastener holes defined therein,
a plurality of lockplate fasteners coupled to the bearing lockplate,
each of the lockplate fasteners being received in a respective one of the fastener holes and coupling the bearing lockplate to the to the endshield.

15. The electric motor in accordance with claim 13,
each of the arcuate slots having substantially the same semicircular size and shape having an arc angle in the range between and including about forty-five degrees (45°) and about sixty degrees (60°).

16. The electric motor in accordance with claim 15,
the plurality of arcuate slots comprising two (2) arcuate slots, said slots being arcuately spaced about one hundred and eighty degrees (180°) from each other relative to the rotation axis.

17. The electric motor in accordance with claim 16, further comprising:
a shaft ground fastener,
the bearing lockplate including a plurality of shaft ground mounting holes,
the shaft ground fastener being received in a respective one of the shaft ground mounting holes and coupling the shaft ground assembly to the bearing lockplate,
the plurality of shaft ground mounting holes including a first grouping and a second grouping,
the first grouping of shaft ground mounting holes being arcuately spaced about one hundred and eighty degrees (180°) from the second grouping of shaft ground mounting holes relative to the rotation axis.

18. The electric motor in accordance with claim 16,
a radial line positioned generally central to the first grouping of shaft ground mounting holes being arcuately spaced about ninety degrees (90°) from a radial line positioned generally central to a first one of the arcuate slots relative to the rotation axis.

19. The electric motor in accordance with claim 13,
the bearing lockplate presenting an outer circumferential edge that includes a notch defined therein for identifying an orientation of the bearing lockplate.

20. The electric motor in accordance with claim 13,
the bearing lockplate including a substantially planar first plate surface and a parallel opposite second plate surface,
the first plate surface engaging at least a portion of the bearing assembly,
the shaft ground assembly being coupled to the second plate surface.

* * * * *